D. D. MINEHART.
TIRE TRUNK.
APPLICATION FILED OCT. 24, 1912.
1,107,692.
Patented Aug. 18, 1914.
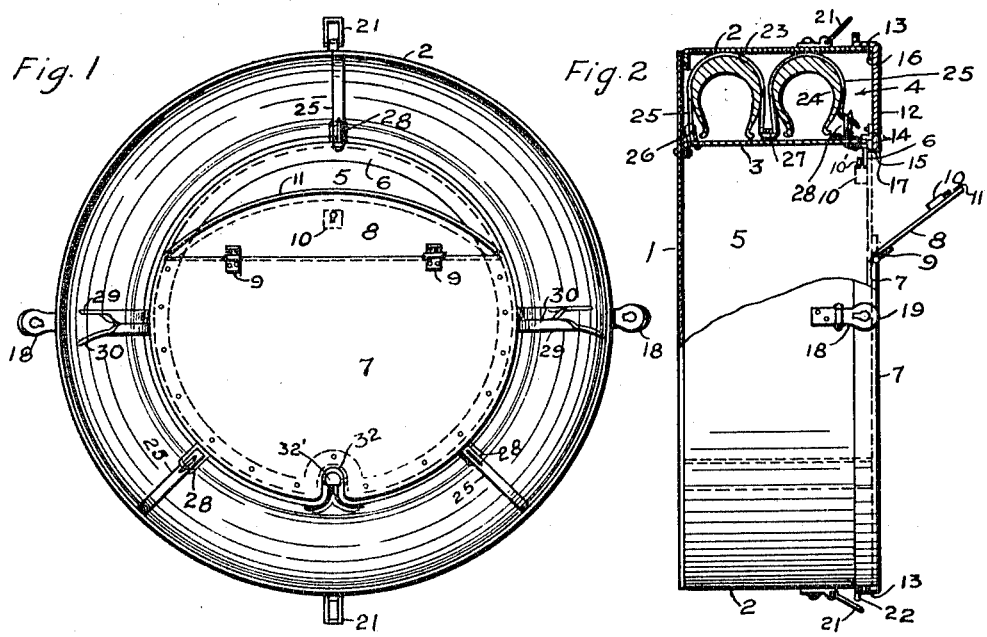
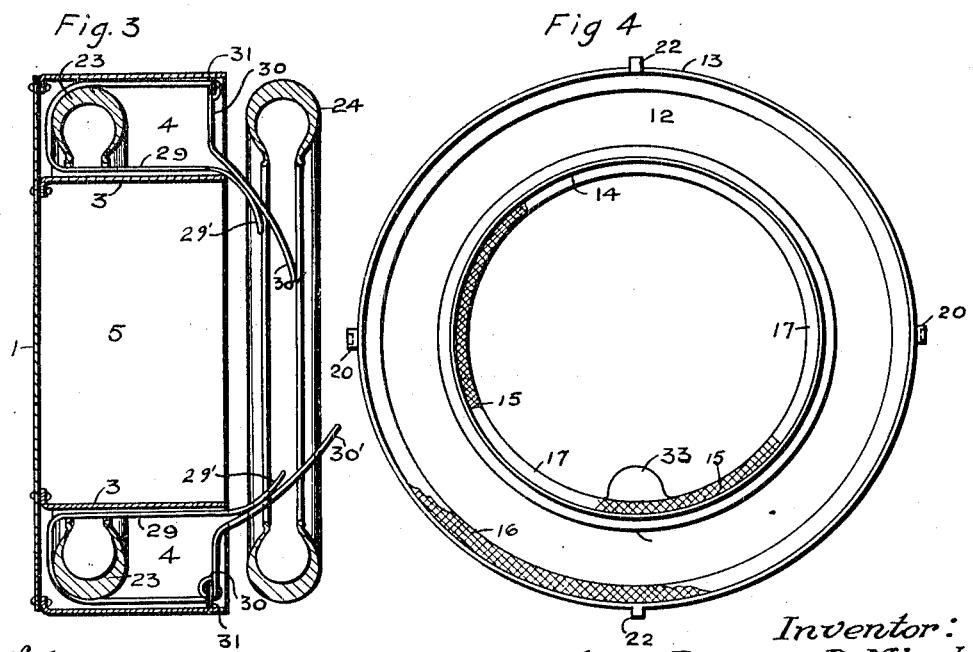
Witnesses:
W. N. Kishby
Robert A. Stehr
Inventor:
Denman D. Minehart
by James R. Townsend
his atty.

UNITED STATES PATENT OFFICE.

DENMAN D. MINEHART, OF LOS ANGELES, CALIFORNIA, ASSIGNOR OF ONE-HALF TO EMIL L. KORNFELD, OF LOS ANGELES, CALIFORNIA.

TIRE-TRUNK.

1,107,692. Specification of Letters Patent. Patented Aug. 18, 1914.

Application filed October 24, 1912. Serial No. 727,607.

*To all whom it may concern:*

Be it known that I, DENMAN D. MINEHART, a citizen of the United States, residing at Los Angeles, in the county of Los Angeles and State of California, have invented new and useful Improvements in Tire-Trunks, of which the following is a specification.

My invention relates to an easily and cheaply manufactured tire trunk which includes an outer annular compartment for tire casings, an inner circular compartment for blankets, automobile accessories, etc., a locking closure for the outer annular compartment and another separate locking closure for the inner circular compartment.

An object of this invention is to reduce the weight and the cost of manufacturing tire trunks and to increase the ease and convenience with which the several closure means may be operated so as to render the several compartments more accessible. To this end a closure is provided for the inner circular compartment, and a separate and independently operable annular closure is also provided for the outer annular compartment.

Another object is to provide for the easy and convenient removal of one or more tire casings from the tire compartment of the trunk. To this end, any suitable expelling means, such as straps, that are fastened as hereinafter described, may be provided.

Other objects may become clear in consideration of the following detail description or from the accompanying drawings.

The accompanying drawings illustrate the invention.

Figure 1 is a front elevation of the trunk showing the tires in place, the annular closure for the tire compartment being removed, and the hinged door of the inner circular compartment being partly open. Fig. 2 is a side elevation of the trunk with the outer cylindrical member partly broken away to show the tires and the securing straps for same in place; the hinged door for the inner compartment being shown in its opened position by the full lines and in its closed and locked position by the dotted lines. Fig. 3 is a diametral plan section of the trunk and shows the expelling straps and second tire just prior to insertion of same into the tire compartment. Fig. 4 is an elevation of the annular closure for the tire compartment.

The trunk is constructed of any light water-proof material such as papier mâché, aluminum, sheet iron, etc., and comprises a circular back-piece 1 having an outer cylindrical member 2 and an inner cylindrical member 3 suitably and concentrically fastened to the same, thus forming an outer annular tire compartment 4 and an inner circular compartment 5, the latter serving the function of a satchel in the old arrangement.

To the inner outer edge of the cylindrical member 3 and running completely around same is attached the flange 6 and across the lower portion of same is fastened a sheet 7 forming a permanent partial closure for the inner circular compartment 5. A door or closure 8 is fastened to the permanent closure 7 by means of hinges 9 and is adapted to turn onto the flange 6 so as to seal the inner circular compartment 5. This closure carries a lock 10 adapted to be latched by a key not shown in the drawings, the tongue 10' of said lock being calculated to rise behind the flange 6 as shown dotted in Fig. 2, thus holding the closure in its locked position. A gasket 11 is also provided along the circular periphery of closure 8 and serves to effectively seal the locked door onto the flange 6, so as to prevent any leakage of water into the inner compartment.

The outer tire compartment 4 is closed by the annular removable closure 12 having its outer periphery turned up forming the flanged rim 13 adapted to snugly embrace the cylindrical member 2, and the closure 12 also having an upstanding flange 14 adapted to snugly embrace the inner cylindrical member 3. The purpose of these flanged rims 13 and 14 is to reinforce the outer edges of cylindrical members 2 and 3 respectively, such reinforcement being desirable in view of the weight of the tire casings. This annular closure 12 is also provided with two gaskets 15 and 16 respectively, the former being carried on the inward projection 17 extending beyond the flanged rim 14 and the latter being carried at the periphery of the closure beneath the flanged rim 13. The purpose of these gaskets is to effectively seal the closure 12 about the tire compartment 4 so as to prevent any admission of water or moisture into said compartment.

For the purpose of holding the annular closure 12 against accidental removal from the body of the trunk, and for the purpose of preventing unauthorized persons from tampering with the contents of the trunk, the outer annular closure is fastened to the trunk body by locking means now to be described.

At diametrically opposite points of the cylindrical member 2 are fastened any suitable locks 18 having the pivotal locking portions 19 adapted to be operated by a key not shown. At corresponding points on the annular closure 12 are carried the keepers 20 adapted to coöperate with the elements of locks 18. At other diametrically opposite points on the cylindrical member 2 and displaced ninety degrees from locks 18, are attached two snap latches 21 adapted to coöperate with the raised shoulders 22 on the closure 12 to bind the upper and lower portion of same tight against the trunk.

Though the foregoing discloses the preferred form in which the locks and latches are to be disposed, it is understood that any other well-known locking system may be substituted for the same without departing from the spirit of my invention.

Fig. 2 shows two tire casings 23 and 24 firmly held in place in the tire compartment 4 by a securing strap 25. One end of this strap is secured by any suitable means 26 to the inner cylindrical member 3 to which also are secured the loop 27 and buckle 28. After inserting the first tire 23 the securing strap is bound about same and passed through the loop 27 and after inserting the second tire 24, strap 25 is bound about this also and fastened under tension into the buckle 28. The securing straps 25 are necessary adjuncts since they prevent the heavy tire casings 23 and 24 shaking against each other and against the closure 12, which might be forced off its locks if subject to the severe knocks of which loose tire casings would be capable.

Fig. 3 shows the expelling straps 29 and 30 for the first and second tire casings 23 and 24 respectively, these straps having their ends attached by any suitable means 31 to the cylindrical member 2 and having their other ends 29' and 30' free. The figure shows tire 23 positioned in the trunk with its expelling strap 29 set for action about the same. When it is desired to remove this tire from the trunk the free ends 29' of the expelling straps are seized and by drawing same forward the tire casing will be expelled from the trunk. Due to the smoothness of the tire casing it is obvious that without some such expelling expedient great difficulty would be encountered in removing the tire. The figure shows the expelling straps 30 and the second tire casing 24 in their relative position just prior to the insertion of this second tire. It will be obvious that as the same is slipped into the compartment 4 it will draw its expelling straps 30 into the same relative position that the straps 29 bear toward the tire 23. This tire casing 24 is expelled in the same manner as the tire casing 23.

Fig. 1 shows a preferred distribution of the securing straps and the expelling straps about the tire compartment 4, there being three securing straps 25 and two sets of expelling straps 29 and 30, the latter being diametrically opposite each other and displaced substantially ninety degrees from one securing strap. It will be understood, however, that the number and location of these straps may be varied to suit the convenience of the user such variation lying within the spirit of my invention.

As will be seen from Figs. 1 and 2 the inner cylindrical member 3 has an inwardly projecting concaved portion 32 running the complete depth of the said cylindrical member and being adapted to receive nozzles 32' of the tire casings. The annular closure 12 has a corresponding inwardly projecting concaved portion 33 adapted to lie over and seal the projection 32 of the cylindrical member 3.

In using the tire trunk hereinbefore described the following advantages are attainable because of the separate and independently operable closure provided for the several trunk compartments. Should it be raining or snowing at times when it is necessary to open the outer annular tire compartment, it is possible to do so without opening the inner circular compartment, and valuable millinery, or other articles in the latter need not be exposed to possible damage by the rain or snow. Furthermore, each closure means may be more lightly and cheaply constructed, and may be operated with greater ease and convenience because each is altogether independent of the other. This secures a very practical and efficient tire trunk having maximum convenience and durability coupled with minimum weight and minimum cost of production.

From the foregoing detail description it is believed that the construction and mode of using the tire trunk embraced in this invention will be clear.

I claim:—

1. A kit for automobiles consisting of a structure including in combination an annular tire chamber or receptacle formed by suitably spaced concentric walls with a wall joining their edges at the rear side of the kit, a central receptacle within the inner of said circular walls also closed at its rear side by a wall, an annular flange provided around the inner periphery of said inner circular wall at its front, a centrally open ring-like cover for the annular tire receptacle alone, said ring-like cover provided with concentric flanges to engage said circular walls, a front wall closing a segmental part of the front side of said central receptacle and supported on one part of said annular flange, and a door hinged to said front wall and adapted to close the remaining segmental part of the circular front side of said central receptacle, the free end of said door in closed position being adapted to rest on the part of said annular flange not utilized by the front wall, each of said covers being operative to open and close its receptacle independently of the other while the other is closed.

2. In a tire trunk the combination of a casing having an inner circular compartment and an outer annular compartment adapted to receive two tires, and means within said annular compartment for securing said tires in place and out of contact with one another, said means comprising loops fastened in said annular compartment substantially in the middle of its inner faces, and straps fastened at one end to the rear of the annular compartment and adapted to be passed over one tire, then through one of said loops and then over the second tire and fastened again at the front end of said annular compartment, and means for closing said compartment.

In testimony whereof, I have hereunto set my hand at Los Angeles, California, this 18th day of October, 1912.

DENMAN D. MINEHART.

In presence of—
JAMES R. TOWNSEND,
ROBERT A. STEPS.